Aug. 12, 1958     E. J. WILLIAMS     2,846,770
MEASURING IMPLEMENT
Filed June 3, 1955
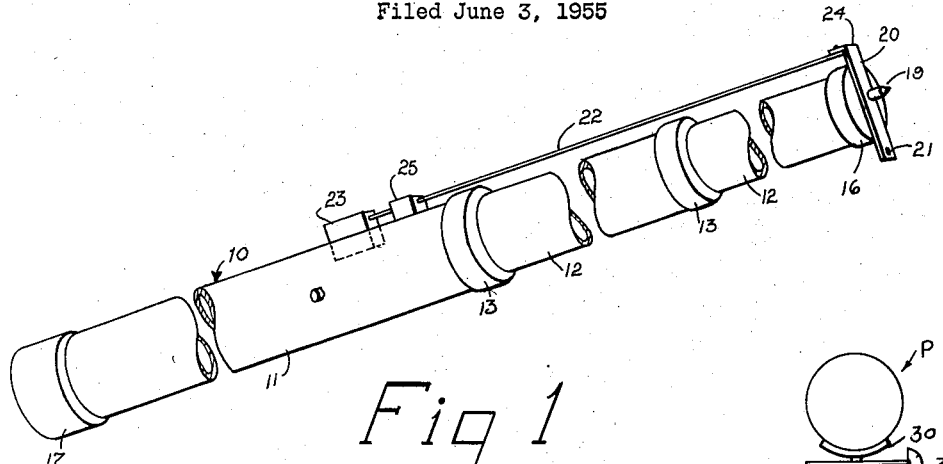
Fig 1
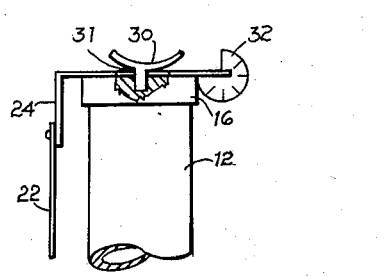
Fig 2
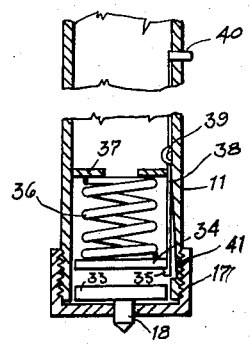
Fig 3
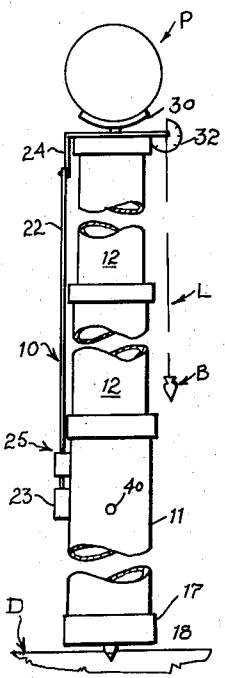
Fig 5
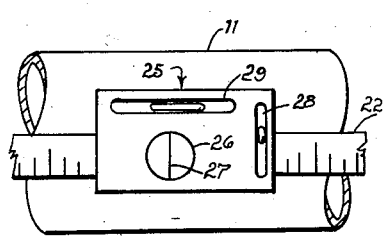
Fig 4
Fig 6
EDWARD J. WILLIAMS
INVENTOR.
BY Herman Chid
ATTORNEY

United States Patent Office 2,846,770
Patented Aug. 12, 1958

2,846,770

MEASURING IMPLEMENT

Edward J. Williams, Charlotte, N. C., assignor to Pneumafil Corporation, Charlotte, N. C., a corporation of Delaware Application June 3, 1955, Serial No. 512,980

4 Claims. (Cl. 33—161)

This invention relates to a novel measuring implement, more particularly an apparatus designed to facilitate the rapid and accurate determination of distances and position relationships between the components of building structures, permitting an operator stationed at a datum to readily measure distances therefrom with a minimum of effort.

A variety of situations present themselves wherein it is desirable to rapidly and accurately determine linear distances and position relationships. Thus in the making of structural alterations, the installation of apparatus in industrial, or commercial, or residential buildings, and the erection of new structures, means must be provided for measuring available clearances and spacings. Any apparatus provided for facilitating the making of the aforesaid measurements should function to provide accurate readings with a minimum of manipulation and calculation and should be readily operable by a single operator. The measuring means should preferably be adequate for measuring distances over a relatively wide range, should be readily portable and manipulable, and of a sturdy nature unaffected by ambient conditions. It is further desirable to provide such means with implementation for determination of: angular relationships, and the shortest distances between surfaces.

Conventional measuring apparatus for the measurement of distances between points on or in structures, as opposed to that apparatus provided for the measurement of land distances and astronomical distances, fall basically into two categories, namely: the rigid rule, whether sectional or unitary, and the flexible tape rule. The former is subject to difficulties arising from lack of manipulability, and the fact that where the distances measured are not commensurate with the rule length, use of said rule becomes awkward. In the use of flexible tapes, care must be exercised to avoid snagging or twisting of the tape so as to avoid erroneous readings and distances between elevated points become difficult of mensuration due to sagging. With both rigid and flexible measuring apparatus, it is often difficult to maintain the terminal ends of the apparatus in measuring position and usually at least two operators are required for this purpose. A variety of other problems are engendered in measuring linear distances arising from the fact that obstructions may be present on the linear path of measurement, and that where measurements are made between planes such as beam or wall surfaces, the shortest distance between these surfaces is not readily determinable. It is also found that ladders and other implementation must be employed to permit the operator to traverse the path of measurement.

It is with the above problems in mind that the present construction has been evolved, a construction providing a measuring apparatus for the rapid and accurate determination of linear distances on and in building structures. The measuring apparatus here provided is of a sturdy, readily portable and manipulable nature, and is adjustable to be commensurate with all generally encountered structural dimensions requiring a minimum of movements on the part of an operator. Implementation is provided to facilitate surface to surface measurement along the shortest line between said surfaces and for determining the angular relationships between surfaces.

It is accordingly a primary object of this invention to provide an improved measuring apparatus.

A further object of this invention is to provide a novel apparatus to facilitate the rapid and accurate measurement of linear distances on or in building structures.

Another object of this invention is to provide a measuring apparatus readily made commensurate with generally encountered dimensions in building structures.

It is also an object of this invention to provide an improved measuring implement readily positionable for mensuration of the shortest linear distance between surfaces.

This invention has as a further object provision of a linear measuring implement which may be securely maintained in measuring position.

A further object of this invention is to provide a measuring implement which permits a single operator stationed at a datum to make measurements between the datum and points remote therefrom.

A still further object of this invention is to provide a measuring apparatus providing accurate and rapid readings of linear distances and angular relationships.

An additional object of this invention is to provide an improved measuring tool of a sturdy, readily manipulable and portable nature, requiring minimal maintenance, and unaffected by ambient conditions.

These and other objects of the invention which will become apparent from the following disclosure and claims are achieved by provision of an elongate rigid body having rigid portions axially extensible therefrom. These extensible portions may if desired be made removable from said body. A measuring rule is carried between said body and the remote end of said extensible portions. A level is secured to said body, and datum marking means are carried at one end of said body. The remote end of said portion is provided with an attachment for securing a plumb line to hang either parallel or perpendicular with respect to said elongate body, and a protractor marked off in degrees is mounted on said attachment to lie adjacent said plumb line.

The specific constructional features of the novel measuring implement and its mode of utilization will be made most manifest and particularly pointed out in conjunction with the accompanying drawings wherein:

Figure 1 represents a perspective view of the novel measuring implement.

Figure 2 represents a fragmentary elevational view of the remote extensible portion of the measuring implement provided with a plumb line attachment and its protractor.

Figure 3 illustrates a fragmentary cross-sectional view through the body portion of the inventive construction, showing the details of the marking means.

Figure 4 is a fragmentary plan view of the scale viewer and the leveling means.

Figure 5 is an elevational view illustrating the novel measuring device in use.

Figure 6 illustrates a fragmentary cross-sectional view of a typical coupling for the joint between the extensible portions of the device.

Referring now more particularly to the drawings, like numerals in the various figures will be taken to designate like parts.

The improved measuring implement 10 as illustrated in Figure 1 comprises an elongate rigid body 11 having extensible portions 12 axially aligned therewith. The body 11 and the extensible portions 12 are made up of a rigid material such as metal or plastic. It is found preferable, as illustrated in the drawing, to make said body 11 and extensible portions 12 of tubular circular cross-section, with the extensible portions 12 telescoping in the body 11. However, these parts could readily be made of any other cross-sectional shape such as rectangular, triangular, or the like. They may, to facilitate shipment, also be made removable one from the other, and may be provided with joints for separation into smaller component pieces.

Couplings 13 are provided between the extensible portions 12 and between these portions 12 and body 11. These couplings may be of the conventional tripod leg joint type in which the coupling is an internally tapped cap mounted for engagement with the threaded outer surface of the outer tube, and the inner telescoping tube is slightly flared, whereby tightening of the cap secures same against the inner tube. In the preferred embodiment illustrated in Figure 6, coupling 13 in the shape of a cap engages the outer and top surface of the outer member, be it base 11 or portion 12. Inner cap 14 inverted within said outer member is engaged securely at the bottom of extensible portion 12. Thumb screw 15 in threaded engagement through said outer member bears against inner cap 14. Any tightening of thumb screw 15 causes cap 14 to be gripped and precludes relative movement between portion 12 and the outer member. The inner cap 14 also functions to seal off extensible portion 12 from the accumulation of any foreign matter therein.

Top cap 16 and bottom cap 17 as best seen in Figures 1 and 5 seal off the terminal ends of the body 11 and extensible portions 12 from any sediment or the like.

Lower end piece 18 and upper end piece 19 as seen in Figures 1 and 3 provide the end termini of the apparatus. Though only a single centrally positioned upper end piece 19 is illustrated, a plurality (preferably three), may be employed at a spaced distance from each other, and not on a single line, to facilitate measurement at a horizontal distance from a vertical wall. Cross-bar 20 having an aperture 21 for the securement of a plumb-bob line L (see Figures 1 and 5) is secured to top cap 16.

A flexible tape rule 22 mounted on a conventional spring wound reel (shown in dotted lines in Figure 1) in housing 23 has its free end anchored on arm 24 of cross-bar 20. The tape rule is trained through viewer 25 prior to anchoring on arm 24. Tape 22 is of any desired length and is arranged so that when extensible portions 12 are fully retracted within body 11, the numeral appearing beneath the hair-line 27 on lens 26 represents the distance, in this retracted position, between the tips of end pieces 18 and 19.

Viewer 25, as best seen in Figure 4, comprises a lens 26 having a hair-line 27, and levels 28 and 29. The levels which are the conventional sealed glass or plastic tubes partially filled by a liquid are mounted on viewer 25 to lie, one perpendicular to, and the other parallel to tape 22. Thus the position of the bubble in the levels serves to facilitate orientation of the tape 22.

As illustrated in Figure 2, upper end piece 19 may be replaced by an end piece 30 of an upwardly concave configuration. This shape facilitates engagement of the measuring implement with curved surfaces such as pipes, or the like. End piece 30 is supported on shank 31 press fitted into an appropriate recess formed through cross-bar 20 into top cap 16. It will be noted that the aforedisclosed end piece 19 is similarly positioned, and the top end pieces 19 and 30 are interchangeable.

A protractor 32, as shown in Figures 2 and 5, may be secured on cross-bar 20 with its center at plumb-bob securing aperture 21 to provide greater accuracy of alignment of the measuring implement than available with levels 28 and 29. The aforesaid alignment means may be used conjointly or individually.

Means are provided for marking a datum point from which measurements are taken. As illustrated in Figure 3, this means comprises a movable base plate 33 on which lower end piece 18 is secured. A bearing plate 34 is held by latch 35 at a spaced distance above base plate 33. Compression spring 36 is maintained under compression between stops 37, extending from the inner side walls of base 11, and the bearing plate 34. Latch 35 is supported on lever 38 pivoted on fulcrum 39. Button 40 extending through the side wall of base 11 permits fulcruming of lever 38 into cavity 41 formed in base 11. Fulcruming of the lever 38 moves latch 35 attached thereto to release bearing plate 34 whereby it strikes base plate 33 to cause lower end piece 18 to mark any surface against which it rests. A spring (not shown) at fulcrum 39 pivots lever 38 back to a position where latch 35 may engage bearing plate 34. The plate 34 is returned to latch engaging position by forcing base plate 33 thereagainst as occurs when end piece 18 is pressed upon.

Operation

When it is desired to measure the linear distance between any two surfaces, employment of measuring implement 10 as illustrated in Figure 5 serves to provide a rapid and accurate reading of distances between surfaces. In the illustrated situation a measurement is being made of the distance between a datum D and a curved surface such as pipe P. The extensible portions 12 are withdrawn from base 11 until end pieces 18 and 30 contact the surfaces between which measurements are being made. Note that concave end piece 30 is employed since the surface of P is curved. Line L having plumb-bob B at its lower end is secured in aperture 21 of cross-bar 20. Alignment of line L with the markings on protractor 32 permits a rapid determination as to whether implement 10 is vertical and in this case extending along the shortest mensuration path between surfaces. After proper orientation of the implement, thumb screws 15 (see Figure 6) are tightened, and a reading is taken through viewer 25. If it is desired to mark the point from which the measurement was taken, pressure on button 40, as above discussed, provides an impact on lower end piece 18 to mark the surface of datum D.

Measurement between plane vertically spaced surfaces is similarly accomplished, save that end piece 30 is replaced by end piece 19.

Where linear measurements are desired between horizontally spaced surfaces, the implement 10 is oriented into a horizontal plane by use of either or both of plumb-bob B and levels 28 and 29.

Greater accuracy in the positioning of the measuring implement 10 with respect to a vertical surface from which measurements are being made is accomplished by employing the aforementioned trio of top end pieces 19. Where at least three non-aligned end pieces contact a surface the implement will be perpendicular to said surface.

Determination of angular relationships is accomplished by engaging the end pieces of the implement between any two points, positioning the plumb-bob over the third point and reading the upper acute angle of the right triangle formed on protractor 32.

It is thus seen that an efficient, readily manipulable, highly accurate measuring implement has been provided to facilitate the making of linear measurements and the determination of angular relationships, permitting an operator stationed at a datum position to make measurements therefrom without necessitating aid in retaining the implement along the path of measurement.

The above disclosure has been given by way of illustration and elucidation, and not by way of limitation

What is claimed is:

1. A measuring implement comprising: an elongate tubular body; an extensible portion telescoping within said body; a cap on the free end of said body; an end piece extending from said cap; means for jarring said end piece to mark any surface with which said end piece is in contact; an end piece on the remote free end of the extensible portion; and a scale carried between said body and said end piece to give a reading directly proportional to the extension of said extensible portion from said body.

2. A measuring implement as in claim 1 in which said means for jarring said end piece comprises: a base plate supporting said end piece, said base plate within said body; a bearing plate spaced from said base plate in said body; a spring biasing said bearing plate toward said base plate; a latch retaining said bearing plate; and a release for said latch, whereby said bearing plate strikes said base plate.

3. A measuring implement comprising: an elongate tubular body; an extensible portion telescoping within said body; caps on the exposed end of the body and the extensible portion to close off the interior of the body and extensible portion, preventing any moisture accumulations therein; a flexible scale supported externally between the tubular body and the remote end of the extensible portion whereby the distance between the remote end of the extensible portion and said body is directly readable on said scale; and spirit levels provided adjacent said scale to facilitate orientation of the measuring implement in either a horizontal or vertical plane.

4. A measuring implement comprising: an elongate tubular body; an extensible portion telescoping within said body; caps on the exposed end of the body and the extensible portion to close off the interior of the body and extensible portion, preventing any moisture accumulations therein; a flexible scale supported externally between the tubular body and the remote end of the extensible portion whereby the distance between the remote end of the extensible portion and said body is directly readable on said scale; a protractor secured at the free end of the extensible portion; and a plumb line secured at the center of said protractor to extend radially thereover to indicate the vertical alignment of the measuring implement.

References Cited in the file of this patent

UNITED STATES PATENTS

| | | |
|---|---|---|
| 160,471 | Robinson | Mar. 2, 1875 |
| 797,824 | Seitz | Aug. 22, 1905 |
| 1,003,626 | Malcolm | Sept. 19, 1911 |
| 1,572,046 | Seiler | Feb. 9, 1926 |
| 2,245,646 | Bullivant | June 17, 1941 |
| 2,249,707 | Frost | July 15, 1941 |
| 2,729,897 | Smith | Jan. 10, 1956 |
| 2,795,050 | Van Fleet | June 11, 1957 |